(12) United States Patent
Johnson (10) Patent No.: US 7,047,203 B2
(45) Date of Patent: May 16, 2006

(54) PERSONAL SECURITY TRACKING SYSTEM

(76) Inventor: Michael K. Johnson, 301 W. 21st St., Hayes, KS (US) 67601

( * ) Notice: Subject to any disclaimer, the term of this patent is extended or adjusted under 35 U.S.C. 154(b) by 1056 days.

(21) Appl. No.: 09/996,151

(22) Filed: Nov. 28, 2001

(65) Prior Publication Data

US 2002/0066037 A1    May 30, 2002

Related U.S. Application Data (60) Provisional application No. 60/253,537, filed on Nov. 28, 2000.

(51) Int. Cl.
*G06F 17/60* (2006.01)
(52) U.S. Cl. .......................................................... 705/1
(58) Field of Classification Search ................ 705/1; 455/404.1, 458, 460; 340/573.1
See application file for complete search history.

(56) References Cited

U.S. PATENT DOCUMENTS

| | | | |
|---|---|---|---|
| 4,072,825 A | | 2/1978 | McLay et al. |
| 4,524,243 A | * | 6/1985 | Shapiro ........................ 379/38 |
| 5,661,458 A | | 8/1997 | Page et al. |
| 5,940,004 A | | 8/1999 | Fulton |
| 5,955,952 A | * | 9/1999 | Bergman et al. ......... 340/573.1 |
| 6,034,605 A | * | 3/2000 | March ..................... 340/573.1 |
| 6,130,620 A | | 10/2000 | Pinnow |
| 6,359,557 B1 | * | 3/2002 | Bilder ........................ 340/531 |
| 6,463,127 B1 | * | 10/2002 | Maier et al. .................. 379/38 |

OTHER PUBLICATIONS

World Airline News, Family Assistance Task Force Issues Final Recommendations, Oct. 31, 1997, v7, n44.*
Korzeniowski, Basha, Watching out for Workers, Oct. 1993, Cardiff Publishing, c30n10, pp. 44-46.*

* cited by examiner

*Primary Examiner*—John G. Weiss
*Assistant Examiner*—Jamisue A. Webb (57) ABSTRACT

The invention system is an automated system for creating, storing and using registration and itinerary records to provide security to participants. The system automatically monitors itinerary records and prompts the initiation of security response actions such as a telephone call to a participant provided contact person if a participant fails to cancel an itinerary prior to a stated itinerary completion time. The system is also able to receive payment and maintain a current payment status for the participant until a set time of expiration or until the participant fails to cancel an itinerary prior to a stated itinerary completion time.

9 Claims, 8 Drawing Sheets

ITINERARY MONITORING AND CALL-BACK RECORD CREATION PROCESS (STEP 80):

FOR Each (Active) Itinerary Record in Itinerary File  80
If T (present time) < IC (Itinerary completion time, Go to next record
If T> IC, update payment status in registration record to non-current and create Call Back Record and send it to call back process

CALL-BACK PROCESS (STEPS 90-94):

FOR EACH CALL BACK   90
RECORD:
If T> X1 and no cancellation indication exists prompt Phone Call . Input Cancellation if participant confirms IF T>X2  AND IF   92
No Cancellation indication exists:
Prompt Phone Call 2, Input cancellation if participant confirms IF T>X3  AND IF NO Cancellation indication exists:
Prompt Phone Call 3, Input cancellation if client confirms
Create Cancellation Failure Record if cancellation is not confirmed
Send Cancellation Failure Record to server   94

FIG. 9

PERSONAL SECURITY TRACKING SYSTEM

CROSS REFERENCES TO RELATED APPLICATIONS

This application claims the benefit of U.S. Provisional Patent Application No. 60/253,537 filed Nov. 28, 2000.

FIELD OF THE INVENTION

This invention relates to an internet based personal security tracking system. More particularly, this invention relates to an internet accessible personal security tracking system that interactively receives from a participant personal itinerary information including a time of itinerary completion, establishes an itinerary cancellation code with the participant and then initiates security responses if the participant does not communicate the cancellation code to the system within a pre-determined time period of the traveler's stated time of itinerary completion.

BACKGROUND OF THE INVENTION

Travelers and other individuals often enhance their security by having other people know about their travel plans or by having other people periodically contact them to confirm their safety. In some cases, because of privacy concerns, individuals may be reluctant to make such personal security arrangements. Still further, such personal, security arrangements may be subject to misunderstanding or miscommunication. A manual system for providing a personal security service wherein participants communicate plans to security personal and then cancel those plans upon the completion of an itinerary would require significant labor and if done commercially would require substantial fees. Thus, there is a need for a system that will perform a security monitoring function for a large number of participants while consuming little or no labor. Such as system would provide a significant level of personal security at a very low cost.

SUMMARY OF THE INVENTION

Accordingly, it is an object of this invention to provide an automated security service that can be administered and monitored with virtually no effort. Another object of this invention is to provide an automated system that interactively receives itinerary information from a participant, creates an itinerary record and then initiates a security response if the participant fails to communicate the completion of the itinerary prior to the participant's stated itinerary completion time. Still another object of this invention is to provide a means for informing persons selected by the participant of a participant's failure to indicate the safe completion of an itinerary.

These and other objects of the invention are attained in the invention personal security tracking system. The invention system is an automated computer based system that can be based in an internet web-site. It provides a personal security tracking system for use by participants who are traveling or who wish to be monitored by means of an itinerary cancellation process. With the invention system, if a participant cancels an itinerary prior to his or her stated itinerary completion time, no labor is required to monitor the timely completion of the itinerary. The invention system is computer based and can include a file server that a participant can access via the internet. In the preferred embodiment, the system supports a participant registration process, an itinerary tracking and cancellation process and a call-back function.

In the registration process, a file server hosting an internet web site sends input forms such as a prompt in an HTML format to a participant who has accessed the site. The participant completes the registration form by providing his or her name, telephone number and other pertinent information as well as the name and telephone number of at least one contact person. During registration, a participant would establish an identification code such as a personal identification code (PIC). Other forms of identification such as passwords, answers to secret questions or e-mail addresses may be used to identify a participant. While registering, the participant may also be guided through a payment process that when completed, causes a current payment status to be stored in the participant's registration record. The system can be configured to prompt the participant to make periodic payments to use the system by having the payment status expire to a non-current condition at pre-determined intervals. All of the resulting registration data is stored and maintained as a registration record.

Once a participant is registered, the participant may access the itinerary creation process by interactively selecting an indicator which activates an itinerary input screen. The participant interactively provides his or her PIC to identify himself or herself and then interactively inputs itinerary information relating to a planned trip or activity. The itinerary information is used to create an itinerary record that includes at a minimum a time of itinerary completion. The time of itinerary completion is the time by which the participant must cancel the itinerary using a method described below in order to prevent the system from initiating a call back function. The participant might also be given an opportunity to provide any other itinerary information in a narrative field or other input fields. During this input process, the web site software responds by establishing with the participant a cancellation code. All of the itinerary related information is then stored in an itinerary record.

The participant, upon his or her completion of an itinerary, can access the web site, provide identification using his or her PIC and enter the cancellation code. The system can also include a telephone interface that can receive a PIC and cancellation code to cancel an itinerary. Upon receiving a cancellation, the system performs an update to either delete the corresponding itinerary record or change its status to non-active. The system continuously queries the itinerary records to find active itinerary records having an itinerary completion time that is prior to the time of the query. When the server finds an active, itinerary record after its itinerary completion time, it communicates the information in the itinerary record to a call back function.

The call-back function can be manual or automatic. In a call back function, for example, telephone calls may be placed initially to the participant's telephone number and then to the contact people given in the itinerary file. If, during the call-back function, the participant is contacted, the participant can cancel the itinerary. Telephone calls to contact persons would inform those contact persons that a participant has not canceled an itinerary prior to an itinerary completion time. A call-back function can be arranged to have several call backs performed at predetermined or participant selected intervals. For example, a call-back function could include a series of calls placed to the participant at pre-determined intervals followed by calls placed to a contact person at pre-determined intervals. In a call-back process, a contact person can be a law enforcement entity or even a private security service. In a system receiving payments from participants, a failure to cancel an itinerary prior to the stated itinerary completion time, that is, prior to the initiation of a call-back process could result in changing the participant's payment status to non-current to force the participant to pay for the call back service prior to subsequent use of the system. Changing a participant's payment statues to non-current would also provide an incentive to encourage participants to cancel their itineraries in a timely manner.

DETAILED DESCRIPTION OF THE INVENTION

Figure 1:
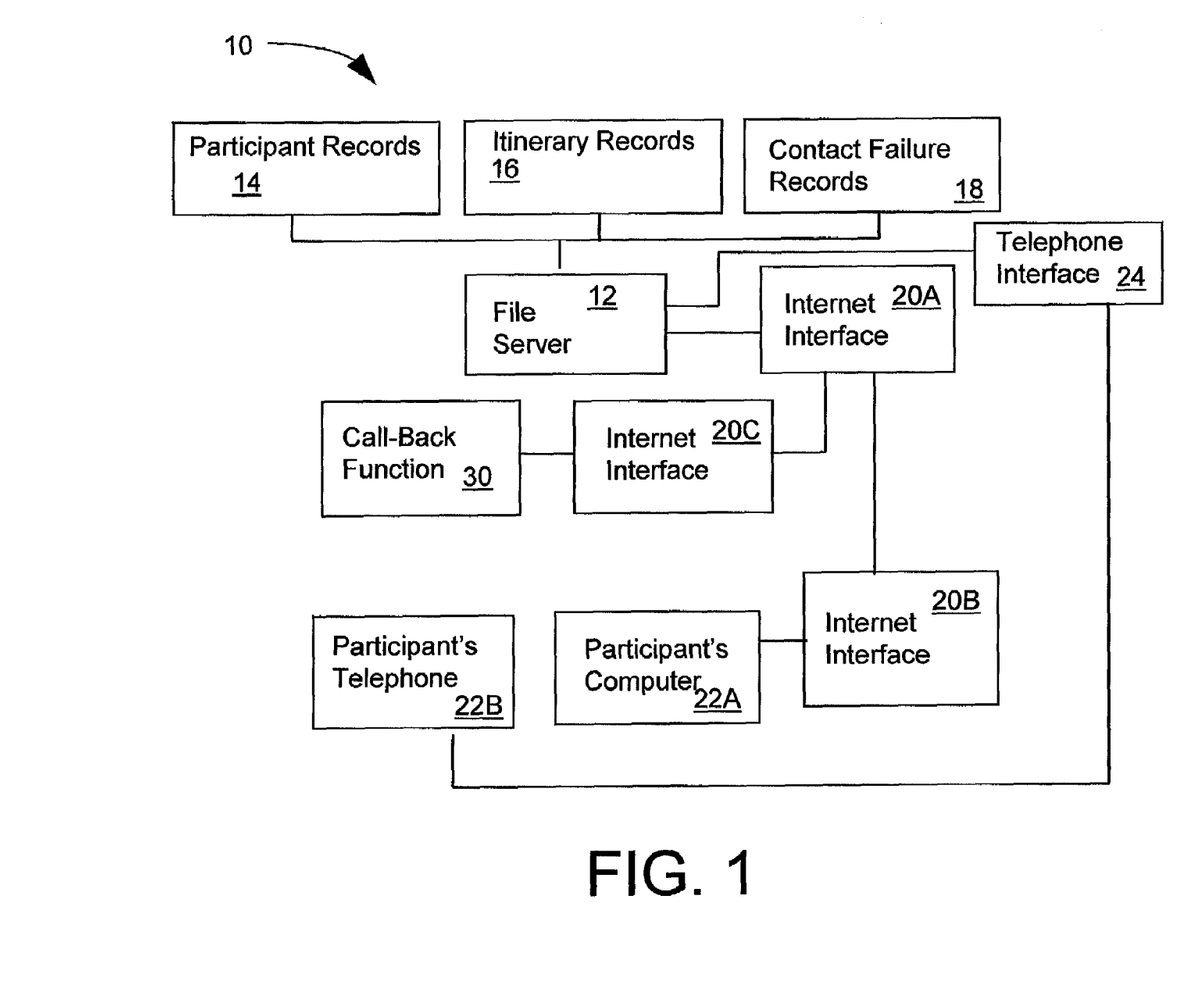
FIG. 1 is a block diagram showing invention system 10.

Turning now to the drawings, wherein like reference numerals identify identical or corresponding elements, and more particularly to FIG. 1 thereof, an block diagram of the invention security system 10 is shown file server 12, a participant computer 22A and internet interfaces 20A and 20B interconnecting file server 12 and participant computer 22A. Participant computer 22A includes an operating system and web browser software for interactively accessing the internet. File server 22A is configured to be able to interact through its internet interface 20A with a large number of participant computers simultaneously. File server 12 is able to store participant records 14, Itinerary records 16 and contact failure records 18. The nature of the contents and the uses for these records will be described in greater detail below. File Server 12 also interfaces through the internet or any suitable communication means a call-back function 30. It is also possible for a participant to use participant telephone 22B to access a telephone interface 24 to communicate specific types of information to file server 12.

Figure 2:
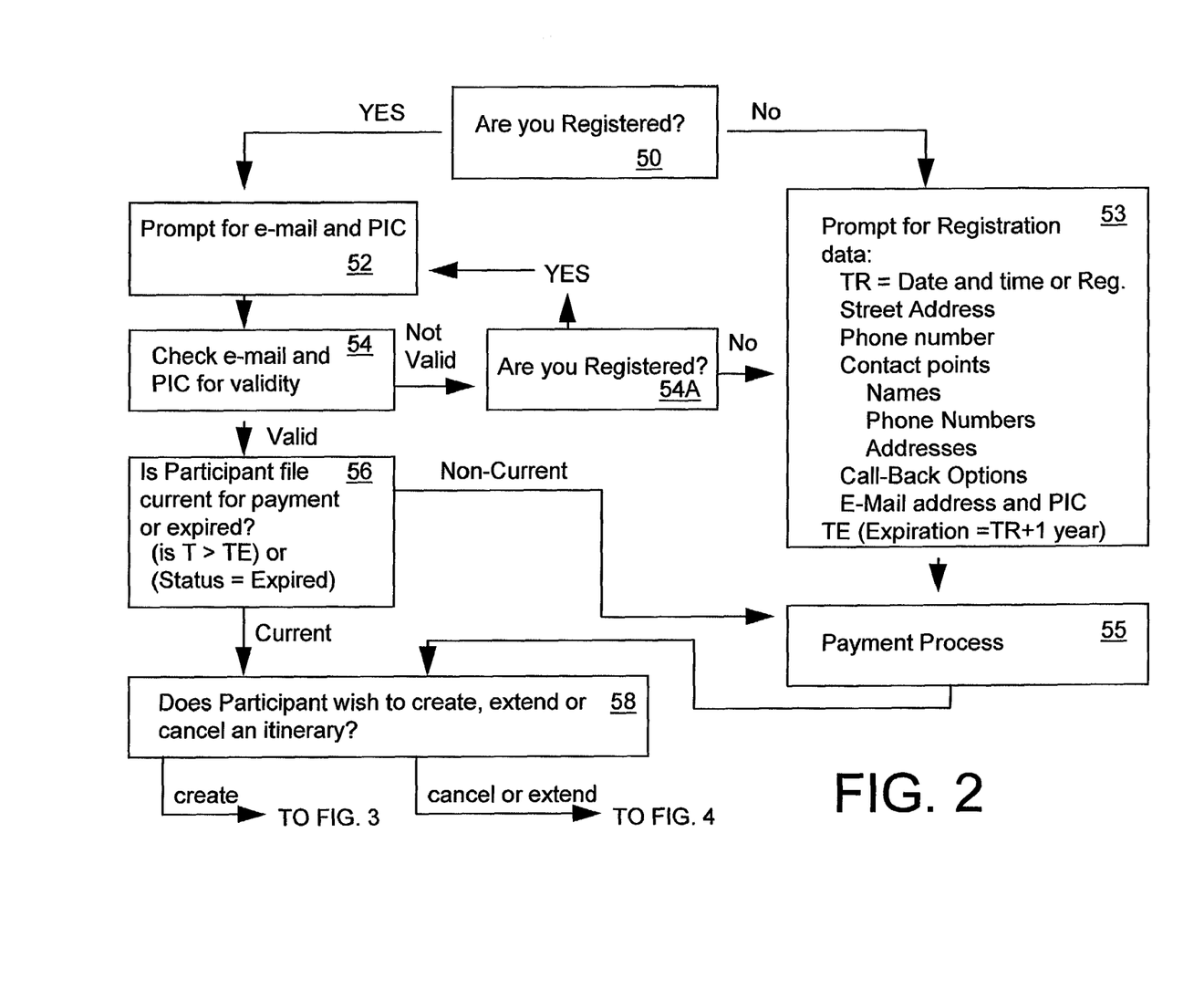
FIG. 2 is a block diagram showing the log-in and registration process of the invention system.
Figure 3:
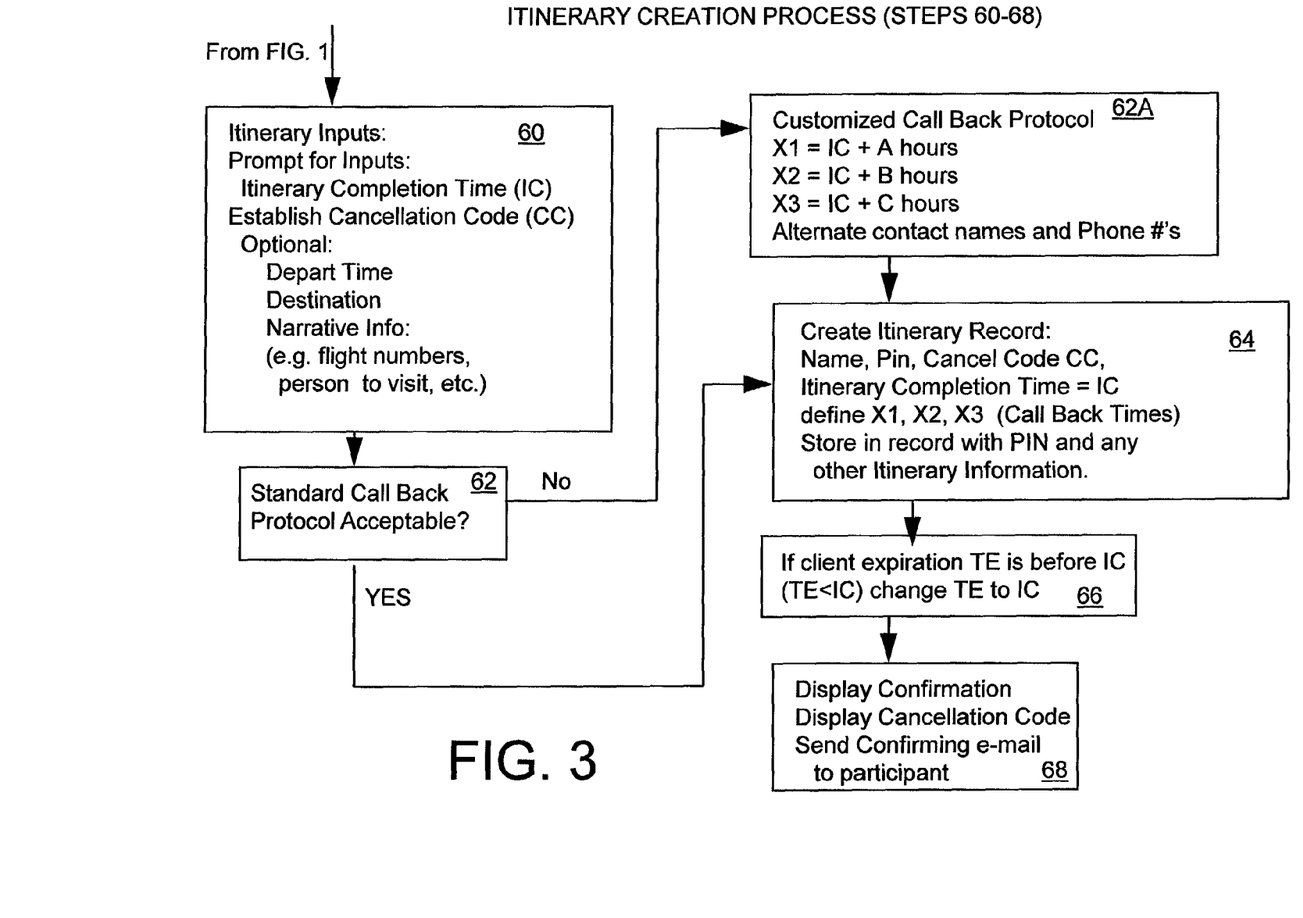
FIG. 3 is a block diagram showing the itinerary creation process of the invention system.
Figure 4:
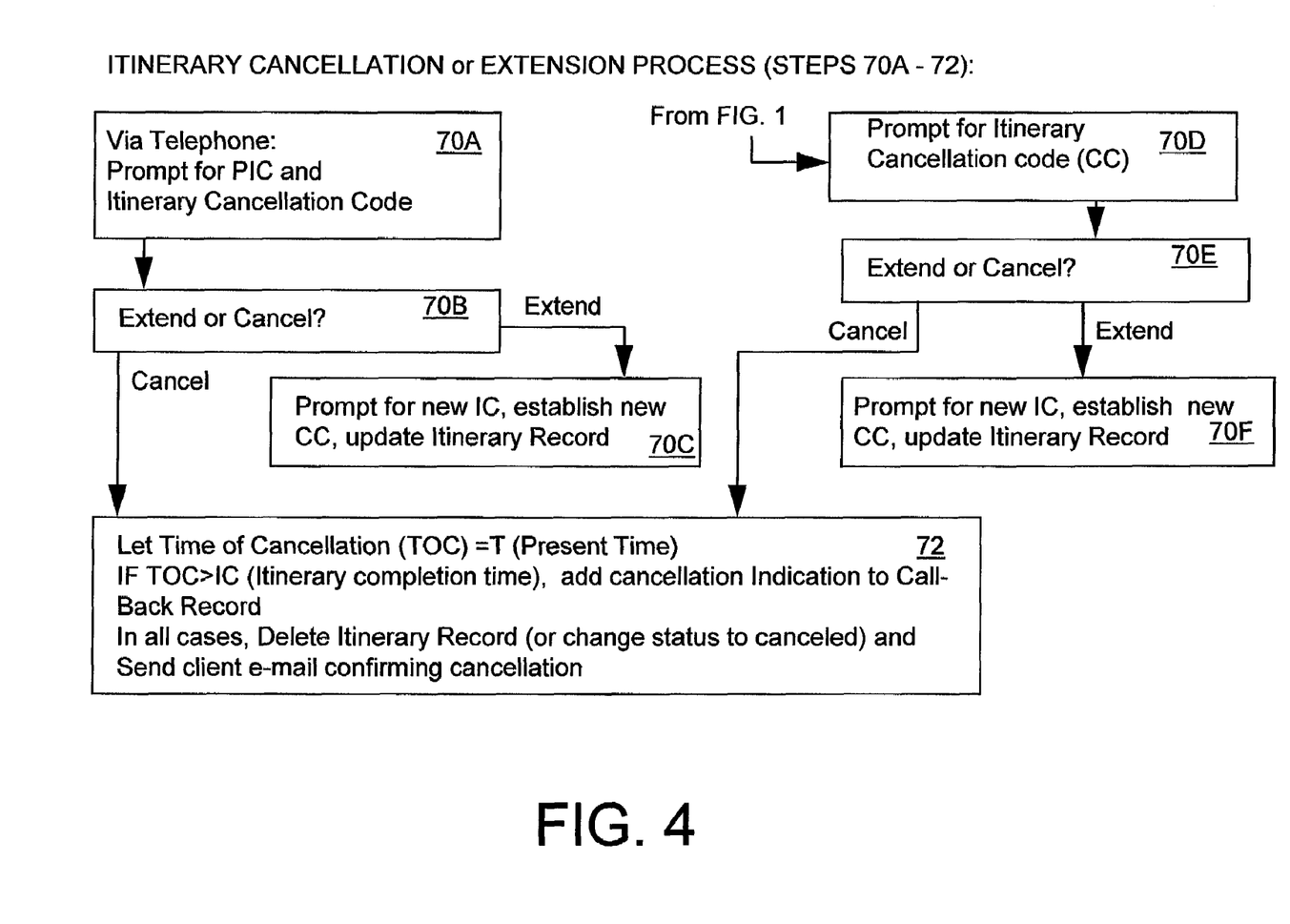
FIG. 4 is a block diagram showing the itinerary cancellation or extension process of the invention system.

With the exception of the call-back process shown as steps 90, 92 and 94 in FIG. 4, nearly all of the steps shown in FIG. 2 through FIG. 4 are steps that are executed by file server 12 of FIG. 1 or are inputs or displays executed at participant computer 22A of FIG. 1. Most of these steps are presented as occurring in one file server through the manipulation of records stored in that one server. It should be easily understood by those skilled in the art that many of the steps or processes shown in FIG. 2, FIG. 3 and FIG. 4 may be allocated to two or more servers interconnected in a network or even interconnected via formatted messages over the internet. Moreover, in lieu of the separate records that are described below, it would also be possible to maintain one comprehensive record for each participant having many fields for accepting data pertaining to all aspects of the services provided.

The steps shown in FIG. 2, FIG. 3 and FIG. 4 generally include a log-on and registration process, an itinerary creation process, an itinerary cancellation or extension process, a call-back record creation process and a call-back process. The registration, itinerary creation and the itinerary cancellation or extension processes are all conducted interactively with the participant. The call-back record creation process is conducted automatically by searching for itinerary records that are over-due. The call-back process is described below as an activity that may be automatically prompted by the participant's failure to cancel an itinerary.

Log-On and Registration Process

In the log-on and registration process, the participant, if not previously registered provides his or her telephone number, street address, the names and telephone numbers of contact persons as well as call-back options. During registration, the participant provides his or her e-mail address and establishes a personal identification code (PIC) so that he or she can log on to the web site. Also during registration, the participant pays for the service via an on-line payment process. If registered, the participant checks in by providing his or her e-mail address and PIC.

FIG. 2 illustrates the participant log-on and registration process. In step 50 the web site gives the participant selectable icons that indicate a registered condition or a non-registered condition. If the participant indicates that he or she is not registered in step 50, the participant is prompted in step 53 to register by providing his or her address, telephone number, contact names and telephone numbers and various security response options. The security response options configure the call-back process for the participant. A default option may include for example a telephone call to the participant's telephone number one hour after any given itinerary completion time and a series of follow-up calls to both the participant's telephone number and the telephone number or numbers of a contact person or contact persons. If the participant indicates that he or she is registered, in step 52, the participant is prompted for an e-mail and PIC. In step 54, the e-mail and PIC are checked for validity. In step 54A participants giving invalid inputs are sent to registration step 53 if they confirm they are not registered or returned to step 52 for a second try if they state that they are registered. Valid Registrants are sorted in step 56 for those whose payment status may have expired. Those having a "non-current" or expired payment status are directed to the payment process of block 55. Those who have current payment status are asked whether they wish to create, extend or cancel an itinerary in block 58.

Itinerary Creation Process

After passing through the registration or log-on process, the participant may go to an itinerary creation process shown in FIG. 3 or to an itinerary cancellation process shown in FIG. 4. FIG. 3 illustrates the steps involved in the itinerary creation process. A participant who indicates that he or she wishes to create an itinerary is directed to step 60 of FIG. 3. In step 60 of FIG. 3, the participant provides an itinerary completion time (IC) and is prompted to establish a cancellation code (CC). Step 60 also prompts the participant for other itinerary information or even any other information that the participant might wish to provide in narrative form.

In step 60, the participant might be advised that the more the effectiveness of any detailed the information provided in terms of destination, names of telephone numbers of people to be visited, flight numbers, times or arrival and departure and the like, the more likely it is that an effective security response can be initiated if he or she fails to cancel the itinerary. In step 62, the participant is asked if a standard call back protocol established in the participant's registration record is acceptable. If not, in step 62A, the participant may customize the call back protocol by changing call-back time intervals and even contact names and telephone numbers. In step 66, the time of the expiration of the client's payment statues in the registration record is compared to the itinerary completion time (IC) of the itinerary record. If expiration occurs prior to itinerary completion, it is changed to be the same as the itinerary completion time. In step 68 the itinerary is confirmed along with the cancellation code and a confirming e-mail is sent to the participant. In step 64, the server creates and stores an itinerary record which includes all of the information relating to itinerary. Those skilled in the art will readily understand that there are numerous ways in which records such as an itinerary record can be stored. A single record could be maintained for each participant, so that all information relating to registration and any itineraries of the participant may be held in one record. Records could also be very distributed as separate registration and itinerary records having corresponding identification codes. Such separate records could even be maintained in a number of interconnected servers. What is important here is that the data is collected, stored and inter-related so that the various functions of the system can be performed.

Itinerary Cancellation and Extension

As can be seen in step 58 shown in FIG. 2, a participant can also choose to cancel or extend an existing itinerary after logging on to the web site. A participant who indicates that he or she wishes to cancel or extend an itinerary in step 58 of FIG. 2 is sent to step 70D of FIG. 4 where the system, already having the participant's PIC, prompts for the cancellation code (CC). If a correct code is provided, the participant in step 70E is prompted to answer whether the participant wishes to cancel or extend. If and extension is selected, in step 70F a new itinerary cancellation time (IC) and cancellation code is interactively established and the itinerary record is revised accordingly. In steps 70A, 70B and 70C a similar process is available via telephone through a telephone interface 24 shown in FIG. 1 that interfaces with the file server. Telephone interface 24 includes as dial tone decoding system that can accept PICs and cancellation codes. With more sophisticated prompting, telephone interface 24 can prompt the participant through an itinerary extension process where a cancellation code and a new itinerary cancellation time are established and confirmed. As with step 70F, in step 70C the itinerary record stored in the server is updated to the new values. If cancellation is the chosen option in step 70B or 70E, the server is programmed to let the time of cancellation equal the present time. An e-mail is sent confirming the cancellation and the itinerary record is deleted or changed to a inactive status.

As is shown in step 72 of FIG. 4, in cases where the time of cancellation is later than the itinerary cancellation time (IC), as in the case of a late cancellation, a cancellation indication is communicated to call back function 30 of FIG. 1. The call-back function will be described in greater detail below.

Itinerary Monitoring and Call-Back Record Creation Process

Figure 5:
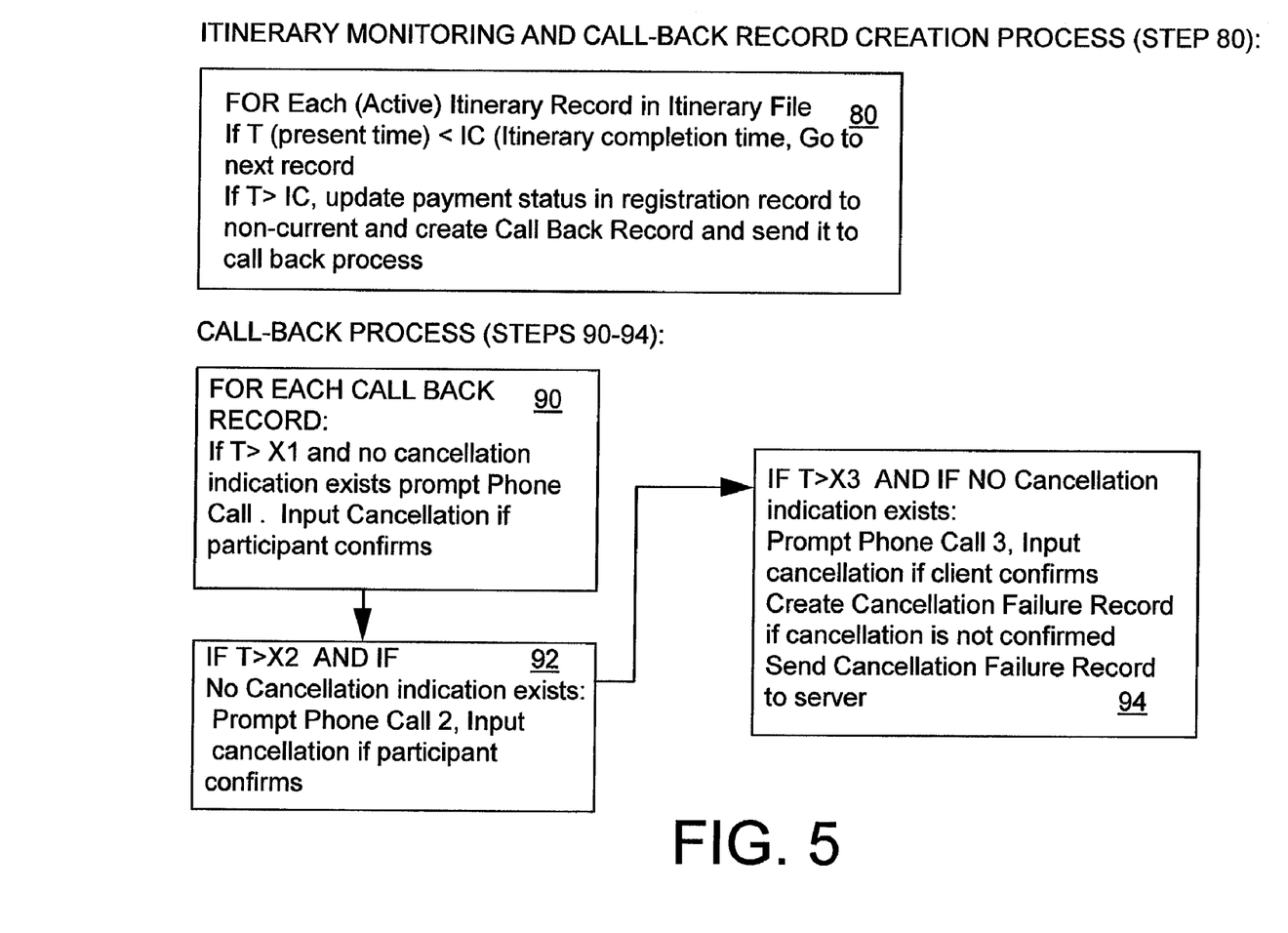
FIG. 5 is a block diagram showing the itinerary monitoring and call-back record creation process and the call-back process of the invention system.

If a participant does not execute the above described itinerary cancellation or extension steps of FIG. 4 prior to the itinerary completion time, a call-back record is created as shown in step 80 of FIG. 5. In that step, server 12 searches for itinerary records that are active after their indicated itinerary completion time. If an overdue itinerary record is found, registration payment status in the corresponding participant registration record is changed to non-current and a call-back record containing participant's name, telephone number, names and telephone numbers of contact persons and all itinerary information is sent to a call-back function. This will force the participant to forfeit his or her registration fee and pay that fee again before creating another itinerary. This loss of a registration fee will also give participant's an incentive to cancel itineraries in a timely manner. When cancellation does occur after the corresponding itinerary completion time, as is shown in step 72 in FIG. 4 and as mentioned above, a cancellation indication is also sent to the call back function to be added to the call-back file. As will be described below, this cancellation indication causes the call-back function to stop taking actions in response to the call-back record.

Call-Back Function

As long as an over-due itinerary is not canceled, the call-back function 30 shown in FIG. 1 and illustrated as steps 90, 92 and 94 of FIG. 5 monitors call-back records and prompts telephone calls to either the participant or call back persons named by the participant. Although call-back function 30 shown in FIG. 1 may be an automated process that processes call-back records and places automated telephone calls to participants and contact persons, it would more likely be performed by operators responding to formatted e-mail messages generated in response to and reflecting the contents of call-back records. In the call back function, a call-back server would prompt operators to make telephone calls to persons at telephone numbers first provided by the participant in step 53 of FIG. 2 or by customized inputs in step 62A of FIG. 3. These calls would be prompted at the default time intervals or customized time intervals X1, X2 and X3 established in step 62A of FIG. 3 as measured from the itinerary completion time. The call back server would also be able to accept cancellation indications generated in step 72 of FIG. 4. If such a cancellation indication is received, no further call-back actions are prompted. If a participant is contacted during the call-back process and the participant cancels an itinerary with the operator during the call, the operator would add a cancellation indication to the call-back record. Otherwise, appropriate contact persons are informed of all of the information in the itinerary record so that they can respond to participant's failure to check-in and cancel his or her itinerary. If no cancellation occurs during the call-back process, a cancellation failure record which gives all relevant information relating to the uncanceled itinerary, the participant and the call-back process is created in step 94, sent to and stored in server 12 of FIG. 1.

Web Site Input Screens

Figure 6:
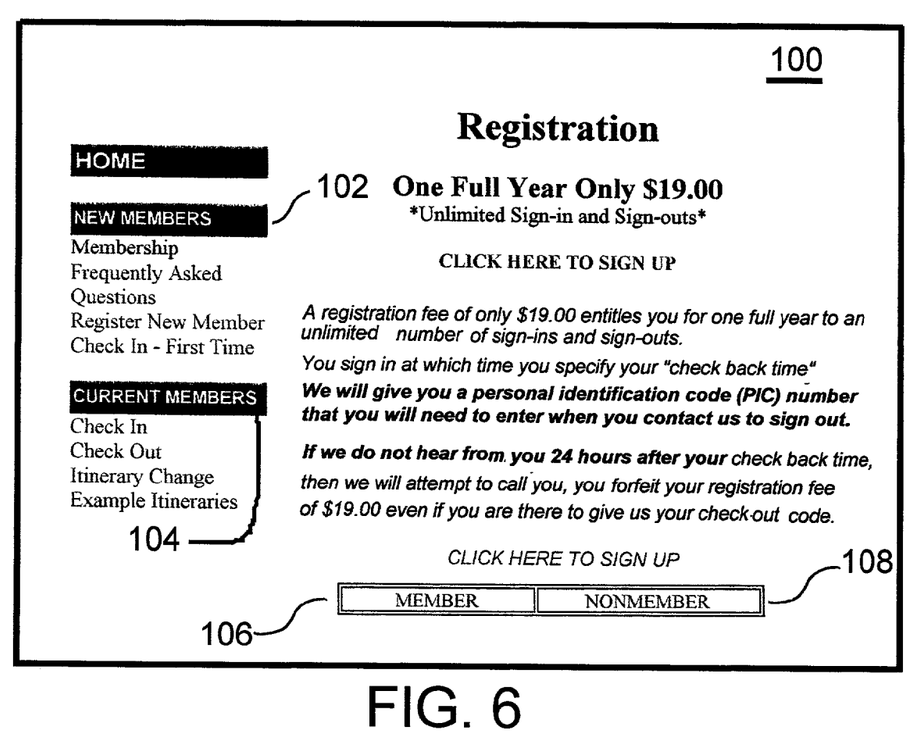
FIG. 6 is a participant log on screen for the client internet interface.
Figure 7:
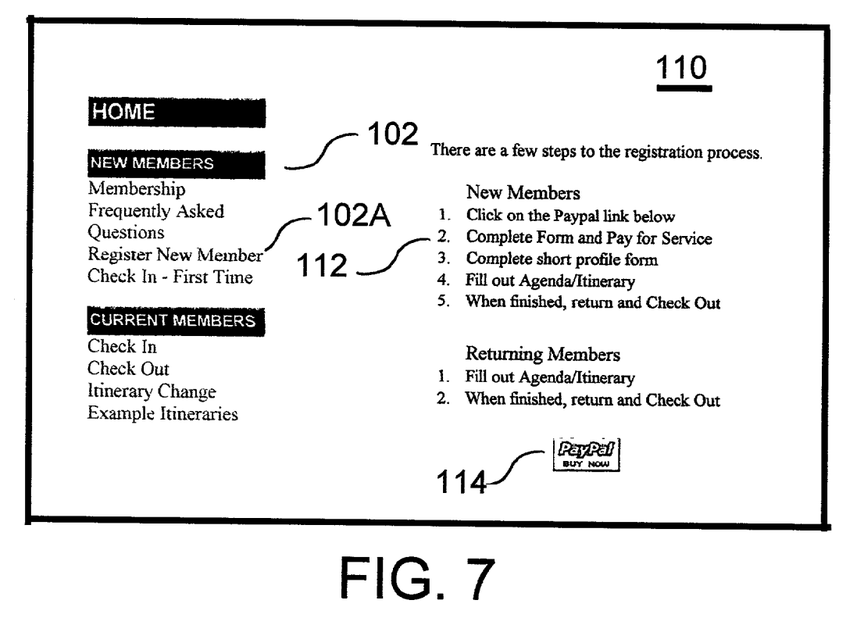
FIG. 7 is a participant information input screen for the registration process.
Figure 8:
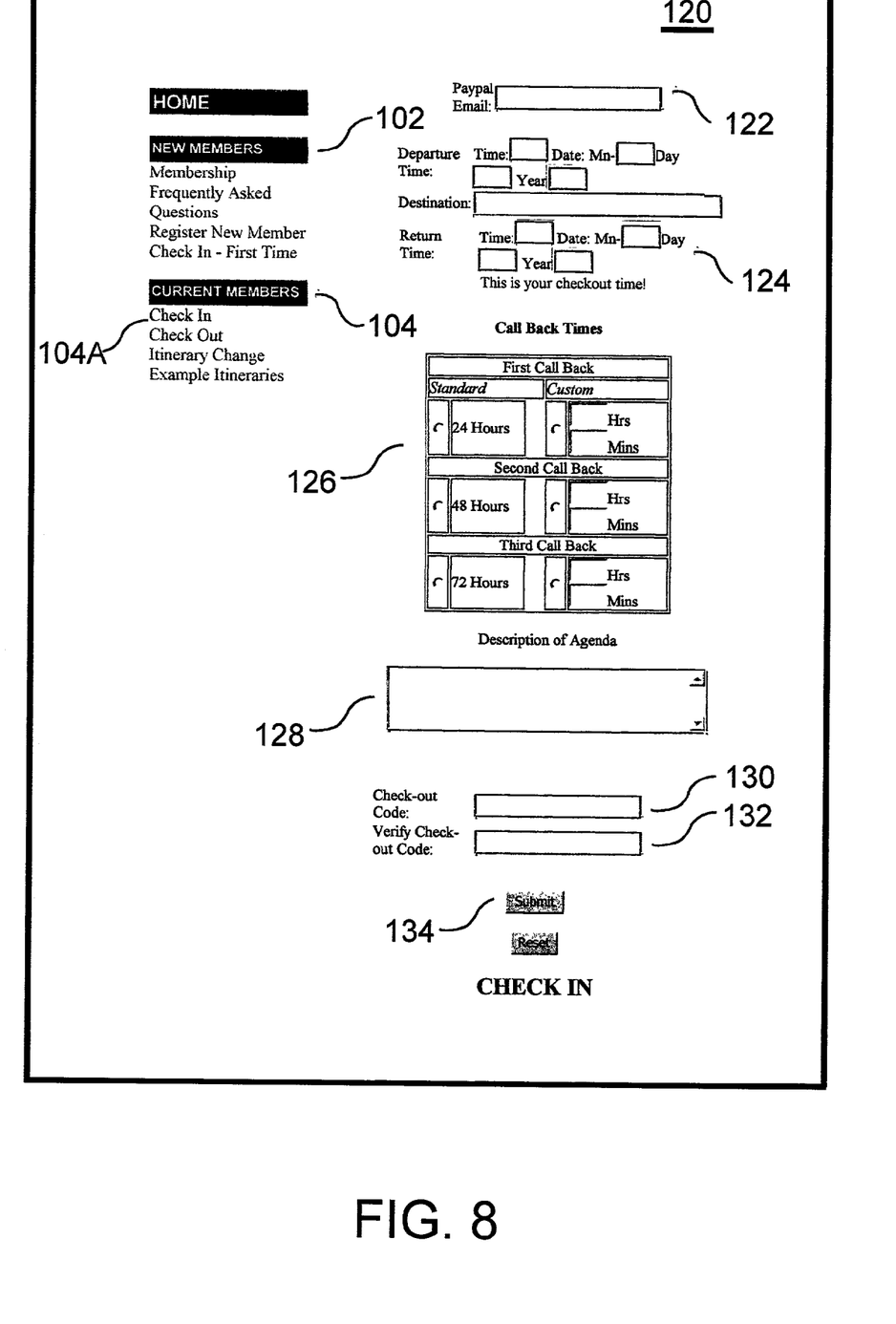
FIG. 8 is a participant information input screen for the itinerary creation process.
Figure 9:
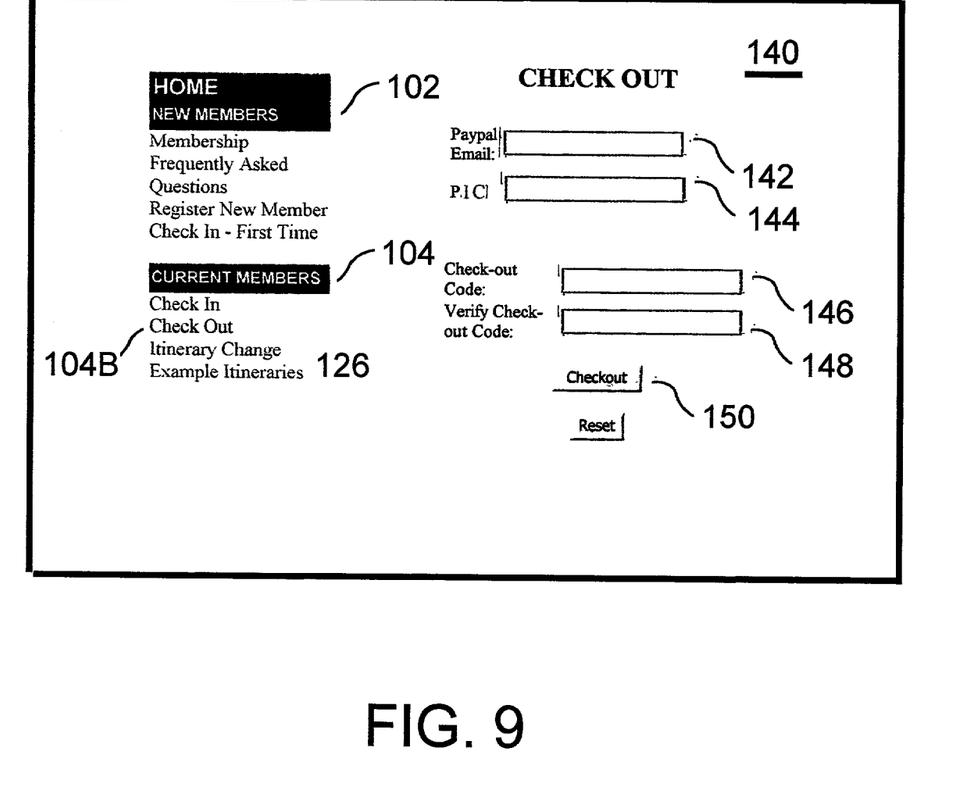
FIG. 9 is a participant information input screen for the itinerary cancellation process.

FIG. 6, FIG. 7, FIG. 8 and FIG. 9 provide example interactive screens that may be displayed on the screen of Participant Computer 22A as HTML web pages within a web site. FIG. 6 shows a home screen that prompts the participant to indicate whether he or she is a member or a non-member, that is whether the participant is registered with the service or not registered. FIG. 7 shows a screen that prompts the registration process. FIG. 8 shows a screen that prompts the itinerary creation process. FIG. 9 shows a screen that prompts a "check-out" process that results in the cancellation of an itinerary.

In FIG. 7, the screen, as with all of the screens in FIG. 7 through FIG. 9, a series of menu items on the left side under a new members heading 102 and a current members heading 104 are presented for selection. Selection of one of these menu items causes various input formats to appear on the right side of the screen. In FIG. 6, a Register New Member 102A item has been selected which has called up registration form 110 which has a series of registration steps 112. By executing the registration steps 112, participant provides information such as is noted in step 53 of FIG. 2. In these examples, a Personal Identification Code (PIC) is established for identifying the participant. The PIC function much like a password. In addition to input steps 112 there is a payment process 114 that relies on the participant's e-mail address. The participant's e-mail address is later used by the system as a user ID.

In FIG. 8, which corresponds to steps 60, 62 and 62A of FIG. 3, inputs are prompted which are used by server 12 of FIG. 1 to create an itinerary record. FIG. 8 shows an itinerary input screen 120 that a participant may activate by selecting a check-in prompt 104A under current members 104. In itinerary input screen 120, a participant is first prompted to input in block 122 an e-mail address for verification purposes and then after providing a departure time is prompted in blocks 124 to provide a "return time". The "return time" is the same as the "itinerary completion time" (IC) described above and noted in step 60 of FIG. 3. In blocks 126 of itinerary input screen 120, the participant is prompted to provide standard or custom call back times for the call-back function. These call-back times correspond to X1, X2, and X3 noted in steps 62A and 64 of FIG. 3. Input area 128 allows the input of other itinerary information. Blocks 130 and 132 allow the participant to establish and verify a "check-out" code which is analogous to the cancellation code (CC) indicated in step 64 of FIG. 3. With block 132, the participant submits the itinerary thus causing server 12 of FIG. 1 to create and store an itinerary record.

FIG. 9 illustrates a check out screen 140 for use in an itinerary cancellation process. Screen 140 is accessed by selecting Check Out icon 104B. When the participant enters his or her e-mail, PIC (also in step 53 of FIG. 2) and Check Out code (analogous to Cancellation Code in step 64 of FIG. 3) in an interactive process that corresponds to step 70D in FIG. 4. Upon receipt of valid codes, server 12 of FIG. 1 executes the functions of step 72 of FIG. 4.

FIG. 6 through FIG. 9 provide us with little or no insight into the itinerary monitoring and call-back record creation process shown in step 80 of FIG. 5 or the call-back process diagrammed in steps 90 through 94 in FIG. 5. These functions do not require interaction with the participant. Monitoring and call-back functions are directed by server 12 of FIG. 1 and carried out by operators involved in executing telephone calls in the call-back function as described above.

As can be seen from the forgoing examples of web site pages for use in a system according to the invention and the above described process steps, the input of participant registration records, participant itinerary records, and the monitoring of those records to support the administration of a security service while even receiving payment for such services can be all accomplished with little or no labor. Thus, the invention system meets the objects noted above by providing a method for receiving, storing and monitoring participant registration records and itineraries and by initiating a security response in the form of a call-back function if a participant fails to cancel an itinerary. The problems associated with manually monitoring and responding to such records for a large number of participants have been eliminated permitting those practicing this invention to provide a useful security service to a large number of persons simultaneously.

The invention has been described above in considerable detail in order to comply with the patent laws by providing a full public disclosure of at least one of its embodiments. However, such a detailed description is not intended in any way to limit the broad features or principles of the invention, or the scope of patent monopoly to be granted. The skilled reader in view of this specification may envision numerous other modifications and variations of the above disclosed embodiments. Accordingly, the reader should understand that these modifications and variations and the equivalence thereof, are within the spirit and scope of this invention as defined by the following claims, wherein I claim:

The invention claimed is:

1. A method of managing and responding to inputs received via communications with participants in a service to enhance personal security, comprising the steps of:
   (a) prompting a participant in an interactive display on a computer connected to a communications network during a first communication to provide at least, said participant's name, an itinerary completion time and a contact name and contact telephone number,
   (b) establishing during said first communication with said participant via said communications network a cancellation code,
   (c) storing said participant's name, itinerary completion time, contact name, contact telephone number and cancellation code in an itinerary record in a computer accessible data file,
   (d) before said itinerary completion time, if a second communication including said cancellation code is received, changing the condition of said itinerary record to a condition selected from the group consisting of deleted or inactive, and,
   (e) after said itinerary completion time, if the condition of said computer accessible data file is not a condition selected from the group consisting of deleted or inactive, transmitting to a call back function a record including at least the name of participant, contact name and contact telephone number, so that said call back function can be performed, said call-back function including at least the step of placing a call to said contact telephone number to inform said contact person that participant has not communicated said cancellation code prior to said itinerary completion time.

2. The method of claim 1 further wherein,
said call back function also includes the step of calling the participant at participant's telephone number.

3. The method of claim 1 further comprising,
the steps of receiving a second communication including said cancellation code after said itinerary completion time and sending a cancellation indication to said call back function to indicate that said itinerary has been canceled so that said call back function may be terminated.

4. The method of claim 1 wherein,
the participant also establishes a personal identification code which is also stored with the itinerary record and wherein, upon receipt of a communication including both said personal identification code and said cancellation code, the system changes the condition of said itinerary record to a condition selected from the group consisting of deleted or inactive.

5. A method of managing and responding to inputs received via communications with participants in a service to enhance personal security, comprising the steps of:
   (a) prompting the participant during a first registration communication to provide at least, the participant's name and telephone number and a contact name and telephone number,
   (b) establishing a participant identification code during said first registration communication,
   (d) creating and storing a participant registration record containing the participant's name, telephone number and identification code in a computer accessible data file,
   (e) prompting the participant during a second communication to select an option of initiating an itinerary,
   (f) if the participant selects said option of initiating an itinerary, prompting the participant to provide an itinerary completion time and establishing with the participant an itinerary cancellation code and storing the participant's name, itinerary completion time, contact name, contact telephone number and cancellation code in a computer accessible data file as an itinerary record and then monitoring said itinerary record as long as said itinerary record is not deleted or is active until such time as when it is later than said itinerary completion time and then when it is later that said itinerary completion time sending a call-back record including information from said participant registration record and said participant itinerary record to a call back function,
   (g) during a third communication with said participant, if said participant selects an option of canceling an existing itinerary, prompting the participant to provide said personal identification code, said itinerary cancellation code and then changing the status of the corresponding itinerary record created during said second communication to a status selected from the group consisting of deleted or inactive and sending an itinerary cancellation indication to said call-back function if said personal identification code and said cancellation code are communicated at a time later than said itinerary completion time, and,
   (h) performing said call-back function in response to receiving a call-back record by placing telephone calls to said participant and to said contact person until contact is established with said participant or contact is established with said contact person and not continuing to perform said call-back function when a cancellation indication is received indicating that said itinerary has been canceled.

6. The method of claim 5 wherein:
   said participant does not provide a contact name and telephone number during said first communication but rather provides a contact name and telephone number during said second communication when said participant selects the option of initiating an itinerary.

7. The method of claim 5 further comprising the steps of:
   during a third communication with said participant, if said participant selects an option of extending said itinerary, prompting the participant to provide said personal identification code and said itinerary cancellation code and in response to receiving said codes, if the receipt of said codes occurs prior to the corresponding itinerary completion time, further prompting said participant to establish a new itinerary cancellation code and a new itinerary completion time, changing the corresponding itinerary record to delete the cancellation code and the itinerary completion time and to replace them with the new itinerary cancellation code and the new itinerary completion time.

8. A method of managing and responding to inputs received via communications with participants in a service to enhance personal security, comprising the steps of:
   (a) prompting the participant in an interactive display on a computer connected to a communication network to provide at least, the participant's name and telephone number and a contact name and telephone number,
   (b) establishing with participant a personal identification code during said first registration communication,
   (c) prompting the participant in said interactive display on said computer connected to said communications network during said registration communication to provide payment,
   (d) creating and storing a participant registration record containing the participant's name, telephone number and personal identification code and also placing in that file a current payment status indication to indicate that participant has provided payment,
   (e) prompting the participant in an interactive display on a computer connected to a communications network during a second communication to select an option of initiating an itinerary,
   (f) if the participant selects said option of initiating an itinerary, prompting the participant to provide payment if participant payment status is not current, prompting the participant to provide an itinerary completion time, establishing with the participant an itinerary cancellation code, storing the participant's name, itinerary completion time, contact name, contact telephone number and cancellation code in a computer accessible data file as an itinerary record, monitoring said itinerary record as long as said itinerary record is active or not deleted until such time as when it is later than said itinerary completion time and then when it is later than said itinerary completion time, changing participant's payment status to non-current, sending a call-back record including information from said participant registration record and said participant itinerary record to a call back function,
   (g) during a third communication with said participant, if said participant selects an option of canceling said itinerary, prompting the participant to provide said personal identification code and said itinerary cancellation code and in response to receiving said codes, changing the status of the corresponding itinerary record created during said second communication to a status selected from the group consisting of deleted or inactive and if said codes are communicated at a time later than said itinerary completion time, sending an itinerary cancellation indication to said call-back function, and,
   (h) performing said call-back function in response to receiving a call-back record by placing telephone calls to said participant and to said contact person until contact is established with said participant or contact is established with said contact person and not continuing to perform said call-back function when a cancellation indication is received indicating that said itinerary has been canceled.

9. The method of claim 8 further comprising the steps of:
during a third communication with said participant, if said participant selects an option of extending said itinerary, prompting the participant to provide said personal identification code and said itinerary cancellation code and in response to receiving said codes, if the receipt of said codes occurs prior to the corresponding itinerary completion time, further prompting said participant to establish a new itinerary cancellation code and a new itinerary completion time, changing the corresponding itinerary record to delete the cancellation code and the itinerary completion time and to replace them with the new itinerary cancellation code and the new itinerary completion time.

* * * * *